(12) United States Patent
Oki et al.

(10) Patent No.: US 11,206,847 B2
(45) Date of Patent: Dec. 28, 2021

(54) PROCESS AND APPARATUS FOR MANUFACTURING OVERHEATED STEM PROCESSED EDIBLE RICE-BRAN

(71) Applicants: Hisaharu Oki, Sagamihara (JP); Harumi Naruse, Koshigaya (JP); Haruyasu Minami, Kinokawa (JP); Chokichi Sato, Tokyo (JP); Yukio Murata, Saitama (JP)

(72) Inventors: Hisaharu Oki, Sagamihara (JP); Harumi Naruse, Koshigaya (JP); Haruyasu Minami, Kinokawa (JP); Yukio Murata, Saitama (JP)

(73) Assignees: Hisaharu Oki, Sagamihara (JP); Harumi Naruse, Koshigaya (JP); Haruyasu Minami, Kinokawa (JP); Chokichi Sato, Tokyo (JP); Yukio Murata, Saitama (JP)

( * ) Notice: Subject to any disclaimer, the term of this patent is extended or adjusted under 35 U.S.C. 154(b) by 613 days.

(21) Appl. No.: 14/411,441

(22) PCT Filed: Jul. 1, 2013

(86) PCT No.: PCT/JP2013/068075
§ 371 (c)(1),
(2) Date: Dec. 26, 2014

(87) PCT Pub. No.: WO2014/003197
PCT Pub. Date: Jan. 3, 2014

(65) Prior Publication Data
US 2015/0320069 A1 Nov. 12, 2015

(30) Foreign Application Priority Data
Jun. 29, 2012 (JP) .............................. JP2012-147790

(51) Int. Cl.
*A23D 9/02* (2006.01)
*C11B 1/10* (2006.01)
*C11B 3/00* (2006.01)
*A23L 7/10* (2016.01)

(52) U.S. Cl.
CPC ................ *A23D 9/02* (2013.01); *A23L 7/10* (2016.08); *C11B 1/10* (2013.01); *C11B 3/00* (2013.01)

(58) Field of Classification Search
CPC .... A23D 9/02; A23L 7/10; C11B 1/10; C11B 3/00
USPC ......................................................... 426/417
See application file for complete search history.

(56) References Cited

U.S. PATENT DOCUMENTS

| | | | | |
|---|---|---|---|---|
| 3,035,920 A * | 5/1962 | Knodt | .................... | A23K 40/10 426/74 |
| 3,078,894 A * | 2/1963 | Satake | ...................... | B02B 3/04 99/605 |
| 4,324,175 A * | 4/1982 | Satake | ...................... | B02B 3/04 99/519 |
| 2009/0162513 A1* | 6/2009 | Gingras | ................. | A21D 2/362 426/551 |
| 2011/0165299 A1* | 7/2011 | Sato | ......................... | A23B 9/04 426/474 |
| 2011/0268826 A1* | 11/2011 | Fukuoka | ................ | A61K 36/88 424/750 |
| 2012/0263704 A1* | 10/2012 | Sugiyama | ............. | A23L 33/135 424/115 |

FOREIGN PATENT DOCUMENTS

| | | |
|---|---|---|
| JP | S57-174063 A | 10/1982 |
| JP | 2000-119681 A | 4/2000 |
| JP | 2002-212585 A | 7/2002 |
| JP | 2005-204637 A | 8/2005 |
| JP | 2008-54586 A | 3/2008 |
| JP | 2009-215437 A | 9/2009 |
| JP | 2010-042071 A | 2/2010 |
| JP | 4838364 B2 | 10/2011 |

OTHER PUBLICATIONS

Machine Translation of the Japanese prior art by Hiroyuki Y et al. JP 2009-215437 (A).*
PCT, "International Search Report for International Application No. PCT/JP2013/068075," dated Jul. 23, 2013.

* cited by examiner

*Primary Examiner* — Bhaskar Mukhopadhyay
(74) *Attorney, Agent, or Firm* — Manabu Kanesaka

(57) ABSTRACT

Rice-bran oil of superior quality can be obtained from rice bran in high yields, and defatted rice bran of superior quality can be obtained as well. The process of the invention comprises a first processing step of bringing overheated steam in contact with fresh rice bran obtained just after rice polishing to deactivate enzymes, a second processing step of extracting rice-bran oil from the rice bran obtained in the first processing step, and a third processing step of isolating and obtaining defatted rice bran. Preferably in the first processing step, overheated steam of 250° C. to 650° C. is brought in contact with rice bran for 0.5 to 60 seconds. The extracted rice-bran oil has a low acid number, and the obtained defatted rice bran is free of bacteria and nasty smells, providing a meal of superior edible quality.

5 Claims, 1 Drawing Sheet

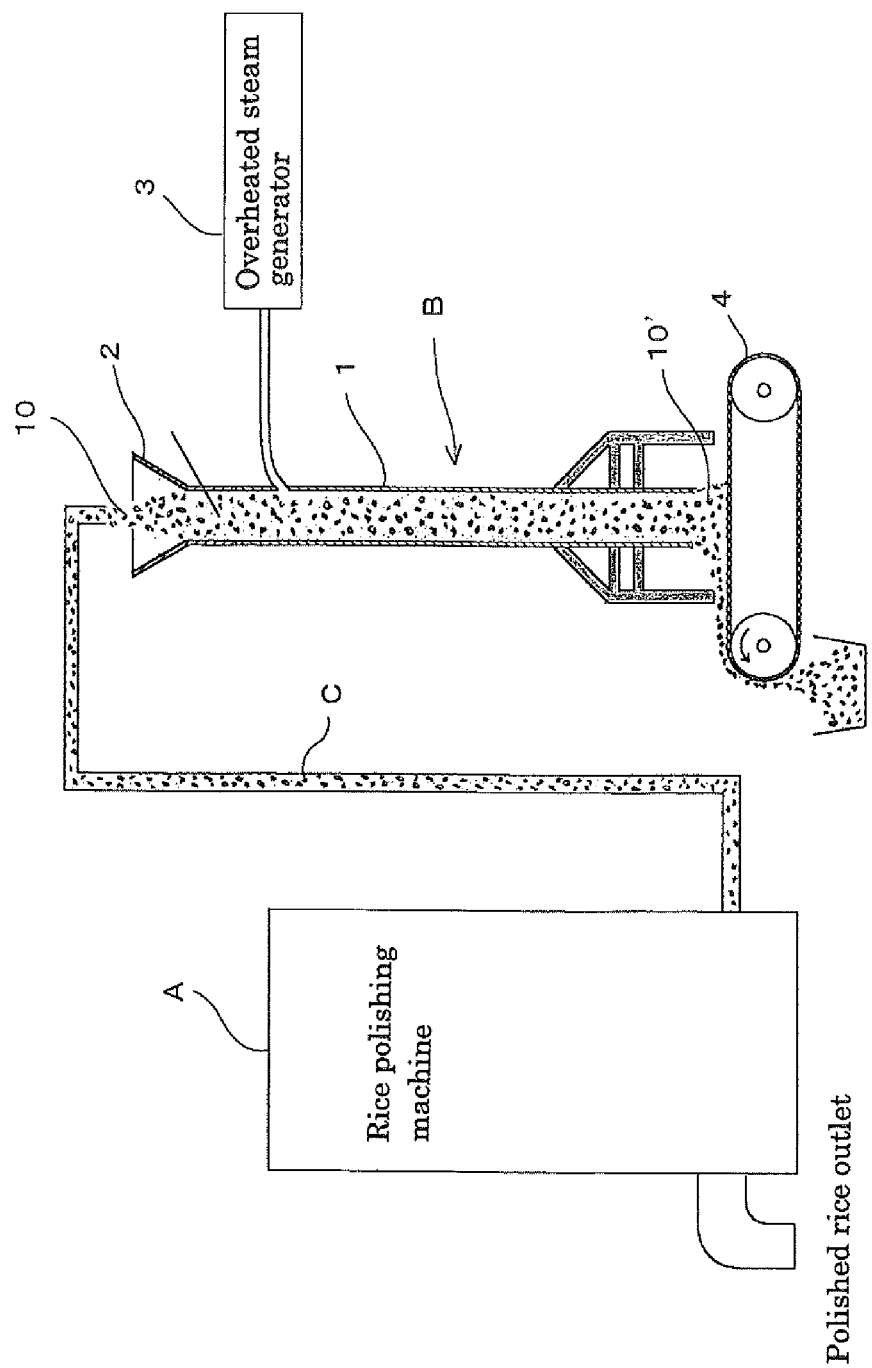

PROCESS AND APPARATUS FOR MANUFACTURING OVERHEATED STEM PROCESSED EDIBLE RICE-BRAN

RELATED APPLICATIONS

The present application is National Phase of International Application No. PCT/JP2013/068075 filed Jul. 1, 2013, and claims priority from Japanese Application No. 2012-147790 filed Jun. 29, 2012.

FIELD OF THE INVENTION

The present invention provides a process and apparatus for manufacturing overheated steam processed edible rice-bran, wherein fresh rice-bran is processed for sterilization and enzyme-deactivation.

BACKGROUND OF THE INVENTION

Oil-and-fat resources that provide a raw material for edible oils and fats in general, and rice bran in particular, are spun out of the rice polishing process of obtaining polished rice from unpolished rice, and the obtained rice bran contains components rich in high nutrition values such as vitamins, minerals, proteins, sugars, lipids and dietary fibers. Oils and fats contained in this rice bran in an amount of about 20% are separated and extracted from it by means of an organic solvent and used as rice-bran oil because they contain a variety of useful trace components such as vitamin E.

However, rice bran degrades by enzymes called lipases; so deactivation of such enzymes as lipases is inevitable for quality stabilization of rice bran.

Chief causes for decomposition of rice bran include acidification of oils and fats by hydrolysis by lipase enzymes, decomposition or deterioration of oils and fats by microorganisms, and oxidization of oils and fats by oxygen in the air.

PRIOR ARTS

Patent Publication

Patent Publication 1: JP(A) 2005-204637

SUMMARY OF THE INVENTION

Problems with the Prior Art

Rice bran contains a lot of nutrients as mentioned above, but it is not that effectively used due to its rapid decomposition and quick deactivation of enzymes or most of it is only used as an additive for compound feed.

If the yield of extraction of rice-bran oil from rice bran is enhanced while rice bran is prevented from decomposition with its nutrients kept intact, its effective utilization would then be greatly improved.

Now the "edible rice salad oil" produced from rice bran is commercially available as salad oil of high quality grade. However, a problem with rice bran that is a raw material for rice salad oil is that triglyceride forming part of salad oil is hydrolyzed by lipase produced by microorganisms present in rice bran, a lipase enzyme that rice bran contains by itself or the like and, although depending on conditions, breaks down into fatty acids and glycerin within a very short time, resulting in a lowering of the yield with which edible oil is obtained.

Therefore, not only lipase that is a sort of enzyme but also deactivation of microorganisms is of much importance.

In high-temperature and high-humidity environments, bacteria and molds grow, ending up with decomposition and so on.

For the raw material (rice bran) collected on site, it was an invariable principle to treat it within a short period of time: it was inevitable to treat at least the collected raw material before the day is over or not to carry that treatment into the next day. In other words, it was a principle to treat (extract) the raw material the same day as collected.

Therefore there is still limitation on where raw material rice bran is collected.

Especially in developing countries having no infrastructures well in order, there are small-size oil makers sparsely located just as in Japan of the past, resulting in the inability to achieve scale merits in view of cost.

Solution of the Problems

The present invention provides a solution for the aforesaid problem by a process and apparatus for obtaining rice-bran oil and defatted rice bran from fresh rice bran, as embodied below.

[1] A process for obtaining rice-bran oil from fresh rice bran, characterized by comprising a first processing step of bringing overheated steam into contact with fresh rice bran obtained just after rice polishing to deactivate enzymes, and a second processing step of extracting rice-bran oil from the rice bran obtained in the first processing step.

[2] A process for obtaining rice-bran oil from fresh rice bran, characterized by comprising a first processing step of bringing overheated steam into contact with fresh rice bran obtained just after rice polishing to deactivate enzymes, a second processing step of extracting rice-bran oil from the rice bran obtained in the first processing step, and a third processing step of isolating and obtaining defatted rice bran obtained in the second processing step.

[3] A process for obtaining rice-bran oil from fresh rice bran, characterized by comprising a first processing step of bringing overheated steam of 200° C. to 650° C. into a 0.5 to 60 seconds contact with fresh rice bran obtained just after rice polishing to deactivate enzymes, a second processing step of extracting rice-bran oil from the rice bran obtained in the first processing step, and a third processing step of isolating and obtaining defatted rice bran obtained in the second processing step.

[4] A process for obtaining rice-bran oil from fresh rice bran, characterized by comprising a processing step (A) of bringing overheated steam of 200° C. to 650° C. into a 0.5 to 60 seconds contact with fresh rice bran obtained just after rice polishing to deactivate enzymes, a processing step (B) of bringing a solvent into contact with the processed rice bran obtained in the processing step (A), a processing step (C) of evaporating the solvent off an extracted liquid obtained in the processing step (B) to batch off rice-bran oil, and a processing step (D) of completely removing the solvent from the rice bran obtained in the processing step (B) and from which rice-bran oil has been extracted to obtain defatted rice bran.

[5] An apparatus for obtaining rice-bran oil and defatted rice bran from fresh rice bran, characterized by comprising a rice-polishing machine, an overheated steam feeder located adjacent and connected to said rice-polishing machine, an extractor for extracting rice-bran oil from rice bran, and a unit for batching off defatted rice bran.

[6] The apparatus as recited in [5], characterized in that the overheated steam feeder connected to the rice-polishing machine is connected to the rice-polishing machine from a rice bran outlet of the rice-polishing machine via a rice bran delivery pipe.

According to another embodiment of the invention, preference is also given to a process for obtaining rice-bran oil and defatted rice bran from fresh rice bran, comprising a processing step (i) of bringing overheated steam into contact with unpolished rice to deactivate enzymes, a processing step (ii) of obtaining rice bran from the unpolished rice obtained in the processing step (i), a processing step (iii) of extracting rice-bran oil from the rice bran obtained in the processing step (ii), and a processing step (iv) of isolating and obtaining defatted rice bran obtained in the processing step (iii).

According to yet another embodiment of the invention, it is preferable to bring overheated steam of 200° C. to 650° C. into a 0.5 to 60 seconds contact with fresh rice bran obtained just after rice polishing for sterilization and deactivation of enzymes thereby producing a novel overheated steam-treated rice bran of high nutrition values.

Advantages of the Invention

The present invention makes it possible to obtain rice-bran oil of superior quality in high yields, and allows the extracted rice-bran oil to have a reduced acid number.

The obtained defatted rice bran is free of bacteria and nasty smells, providing an edible meal of superior quality.

According to the present invention wherein fresh rice bran is immediately heated by overheated steam for deactivation of enzymes such as lipase contained in this rice bran and sterilization of bacteria, the oils and fats in the rice bran are not decomposed with time, resulting in no reduction of the contained oils and fats providing an edible oil.

As a result, even when an oil-and-fat matter is extracted out of the rice bran once it has been processed with overheated steam for preservation for a while, for instance, one month, there is less decrease in the yield of rice-bran oil that is edible oil.

The defatted rice bran obtained by the extraction of rice-bran oil from the processed rice bran is free of bacteria with no presence of any nasty smelling components, providing an edible meal of superior quality.

BRIEF DESCRIPTION OF THE DRAWINGS

FIG. 1 is a schematic illustration of the apparatus used in one specific example of the invention.

MODE FOR CARRYING OUT THE INVENTION

The homegrown rice bran to be processed herein is yellowish white hull or embryo flour coming from the refinery of unpolished rice and contains fats, proteins or the like in large quantities.

However, most of rice bran produced in Southeast Asia and the like is obtained by processing parboiled rice—rice that has been immersed in water, heated, and dried—in a rice polishing machine.

An overheated steam (steam plasma) generator used herein includes an electrically conductive body to be heated and a coil for heating that body by electromagnetic induction, wherein incoming water vapor from one end is heated within the body into an ionized state, and high-temperature overheated steam (steam plasma) leaves the other end.

It is preferable that the aforesaid body to be heated is formed of an electrically conductive member because of being heated by electromagnetic induction, and that the overheated steam (steam plasma) is at 200° C. to 850° C. in general and 200° C. to 650° C. in particular.

For this reason, the aforesaid body to be heated is selected from materials that have stability even at a temperature of 850° C. including, for instance, iron, stainless, and copper.

The incoming water vapor is heated by the aforesaid body to preferably 200° C. or higher, and more preferably 250° C. or higher. Especially at 250° C. or higher, the foodstuff may be sterilized on its surface simultaneously with the deactivation of enzymes. In particular, it is preferable that the rice bran is in contact with and irradiated with the overheated steam at 250° C. to 350° C. for 0.5 to 30 seconds.

It is preferable that the high frequency used has an output of 30 kW or greater.

Referring here to one specific example of the apparatus used to bring overheated steam into contact with rice bran, it comprises a transversely mounted cylinder and a rotating screw blade transversely mounted therein, as disclosed in JP(A) 2010-42071. This apparatus is used in combination with a sterilizer of the type where overheated steam is introduced inside. The material to be processed (for instance, rice bran or unpolished rice) is charged in the cylinder through its one end for contact with overheated steam for the deactivation of enzymes and sterilization, and the material processed (rice bran or unpolished rice) for deactivation of enzymes and sterilization is discharged out of another end.

EXAMPLES

The present invention is now explained with reference to one specific example and one comparative example.

Example 1

FIG. 1 is a schematic illustration of the apparatus adopted in one specific example of the invention, in which a rice polishing machine A is operatively connected to an overheated steam processing machine B via a rice bran delivery pipe C.

In FIG. 1, reference numeral 1 stands for an upright cylinder, 2 a rice bran hopper, 3 an overheated steam generator, 4 a processed rice bran delivery machine, 10 rice bran, and 10' rice bran processed with overheated steam.

The rice bran 10 obtained in the rice polishing machine A fell down immediately from the hopper 2 at the upper opening of the upright cylinder 1 via the rice bran deliver pipe C, and came into a 0.5 second contact/irradiation with overheated steam (water vapor plasma) on the way downward.

Note here that the overheated steam generator (water vapor plasma generator) 3 was set such that overheated steam (water vapor plasma of 400° C. is produced at a high-frequency output of 30 kw, a frequency of 9 to 35 kHz and an overheated steam (water vapor plasma) temperature of 400° C.

Note also that the technical procedure adopted herein relied upon "Water Vapor Plasma Generator and Sterilizer" disclosed in U.S. Pat. No. 4,838,364.

The rice bran obtained after the overheated steam processing was stored for one week, then pelletized through an extruder, then extracted with n-hexane to obtain rice-bran oil, then dried to evaporate off n-hexane, and then purified to obtain high-purity rice-bran oil. The yield of rice-bran oil obtained as edible oil was 97%.

The obtained defatted rice bran was completely free of putrid smells and so on, providing a fully edible product serving well as a meal if purified.

Comparative Example 1

Rice-bran oil and meal were obtained from rice bran as in Example 1 with the exception that the rice bran fell down from the upper opening of the upright cylinder was the one obtained by contact and irradiation with overheated steam (water vapor plasma) 2 days after storage of the rice bran obtained in the rice polishing machine.

As a result, the yield of edible rice-bran oil obtained by storing that rice bran for one week, then pelletizing it through an extruder and then extracting it with n-hexane was only 85%.

The obtained defatted rice bran kept on smelling bad odors.

As a result of experimentation, it has been found that:
(1) If fresh rice bran obtained just after going through a polishing step is processed with overheated steam within 0.5 hour for extraction of oil, the yield of edible oil can then be 95 to 98%.
(2) By contrast, if fresh rice bran obtained just after going through a polishing step is processed with overheated steam after one or two days for extraction of oil, the extraction yield is down to 80 to 85%.

It is here noted that the rice bran processed with the abovementioned overheated steam did not undergo a lower of the yield of edible rice-bran oil even upon extraction of rice-bran oil after a one-month storage, and that the obtained defatted rice bran was completely free of putrid smells and so on, providing a fully edible product serving well as a meal if purified.

EXPLANATION OF THE REFERENCE NUMERALS

1: Upright cylinder
2: Rice bran hopper
3: Overheated steam generator
4: Overheated steam processed rice bran feeder
10: Rice bran
10': Overheated steam processed rice bran
A: Rice polishing machine
B: Overheated steam processing machine
C: Rice bran delivery pipe

What is claimed is:

1. A process for obtaining edible rice-bran with nutritional quality from rice bran, comprising:
    preparing the edible rice-bran by processing the rice bran through a rice-polishing machine comprising a rice bran delivery pipe and an overheated steam feeder comprising an upright cylinder, located adjacent, and operatively connected, to the rice-polishing machine through the rice bran delivery pipe;
    obtaining a fresh rice bran by rice polishing from the rice-polishing machine through the rice bran delivery pipe;
    dropping the fresh rice bran through the upright cylinder from a top part thereof immediately after obtaining the fresh rice bran through the rice bran delivery pipe; and
    bringing overheated steam generated from the overheated steam feeder at a temperature of 250° C. to 350° C. into a 0.5 to 30 second contact with the fresh rice bran while being dropped through the upright cylinder.

2. The process as recited in claim 1, wherein the overheated steam is water vapor plasma,
    a high frequency output of the water vapor plasma is set at 30 kw, and
    a frequency of the water vapor plasma is 9 to 35 kHz.

3. The process as recited in claim 1, wherein the fresh rice bran is immediately heated by overheated steam thereby deactivating enzymes and sterilizing bacteria so that oils and fats in the fresh rice bran are not decomposed with time, resulting in no reduction of the oils and fats providing an edible oil.

4. The process as recited in claim 1, wherein the rice bran delivery pipe extends from a bottom part of the rice polishing machine to the top part of the upright cylinder.

5. The process as recited in claim 1, further comprising pelletizing the fresh rice bran by an extruder obtained after the overheated steam is applied thereto, thereby obtaining a pelletized rice bran,
    extracting rice bran oil from the pelletized rice bran with n-hexane, thereby obtaining an extracted rice bran oil, and
    evaporating the n-hexane from the extracted rice bran oil, thereby obtaining a purified rice bran oil and defatted rice bran.

* * * * *